United States Patent
Yankov et al.

(10) Patent No.: US 9,036,994 B2
(45) Date of Patent: May 19, 2015

(54) METHOD OF OPTICAL INTERCONNECTION OF DATA-PROCESSING CORES ON A CHIP

(71) Applicant: NANO-OPTIC DEVICES, LLC, Santa Clara, CA (US)

(72) Inventors: Vladimir Yankov, Washington Township, NJ (US); Konstantin Kravtsov, Moscow (RU); Leonid Velikov, San Carlos, CA (US)

(73) Assignee: NANO-OPTIC DEVICES, LLC, Santa Clara, CA (US)

( * ) Notice: Subject to any disclaimer, the term of this patent is extended or adjusted under 35 U.S.C. 154(b) by 145 days.

(21) Appl. No.: 13/650,092

(22) Filed: Oct. 11, 2012

(65) Prior Publication Data

US 2014/0105613 A1 Apr. 17, 2014

(51) Int. Cl.
| | |
|---|---|
| *H04J 14/00* | (2006.01) |
| *H04B 10/00* | (2013.01) |
| *H04B 10/20* | (2006.01) |
| *H04B 10/80* | (2013.01) |

(52) U.S. Cl.
CPC .................................. *H04B 10/801* (2013.01)

(58) Field of Classification Search
CPC .... H04J 14/02; H04Q 2011/0094; G02B 6/42
USPC ................ 398/60, 63, 67, 68, 73, 79, 91, 139
See application file for complete search history.

(56) References Cited

U.S. PATENT DOCUMENTS

| | | |
|---|---|---|
| 4,838,630 A | 6/1989 | Jannson et al. |
| H738 H | 2/1990 | McManus et al. |
| 5,515,462 A | 5/1996 | Huang et al. |
| 5,706,114 A | 1/1998 | Erteza |
| 5,832,147 A | 11/1998 | Yeh et al. |
| 7,872,788 B2 | 1/2011 | Yankov |
| 7,889,336 B2 | 2/2011 | Yankov |
| 2006/0153566 A1* | 7/2006 | Sorin et al. ...................... 398/72 |
| 2011/0020005 A1* | 1/2011 | Iannelli ......................... 398/115 |
| 2011/0063701 A1* | 3/2011 | Yankov ........................... 359/15 |
| 2012/0243867 A1* | 9/2012 | Merrill et al. .................. 398/45 |

* cited by examiner

*Primary Examiner* — David Payne
*Assistant Examiner* — Casey Kretzer
(74) *Attorney, Agent, or Firm* — TransPacific Law Group; Pavel I. Pogodin, Esq.

(57) ABSTRACT

The invention provides optical interconnects of data-processing cores of multicore chips by means of digital planar holographic microchips. The method comprises delivering "N" laser lights to "N" data-processing cores on the host chip, coding the obtained optical signals by modulating them with the core-generated data, and then delivering the modulated and coded optical signals to a holographic microchip formed on the same substrate of the host chip as the data-processing cores, splitting the modulated and coded optical signals into (N−1)N modulated optical copy signals, delivering the copy signals to all data-processing cores except the one that generates the copy signals, and decoding the data obtained from the output signals delivered to the processing cores by the receivers. The method is efficient in that it allows replacing electrical interconnects between the cores with optical interconnects and can be matched to current semiconductor production technology.

13 Claims, 5 Drawing Sheets

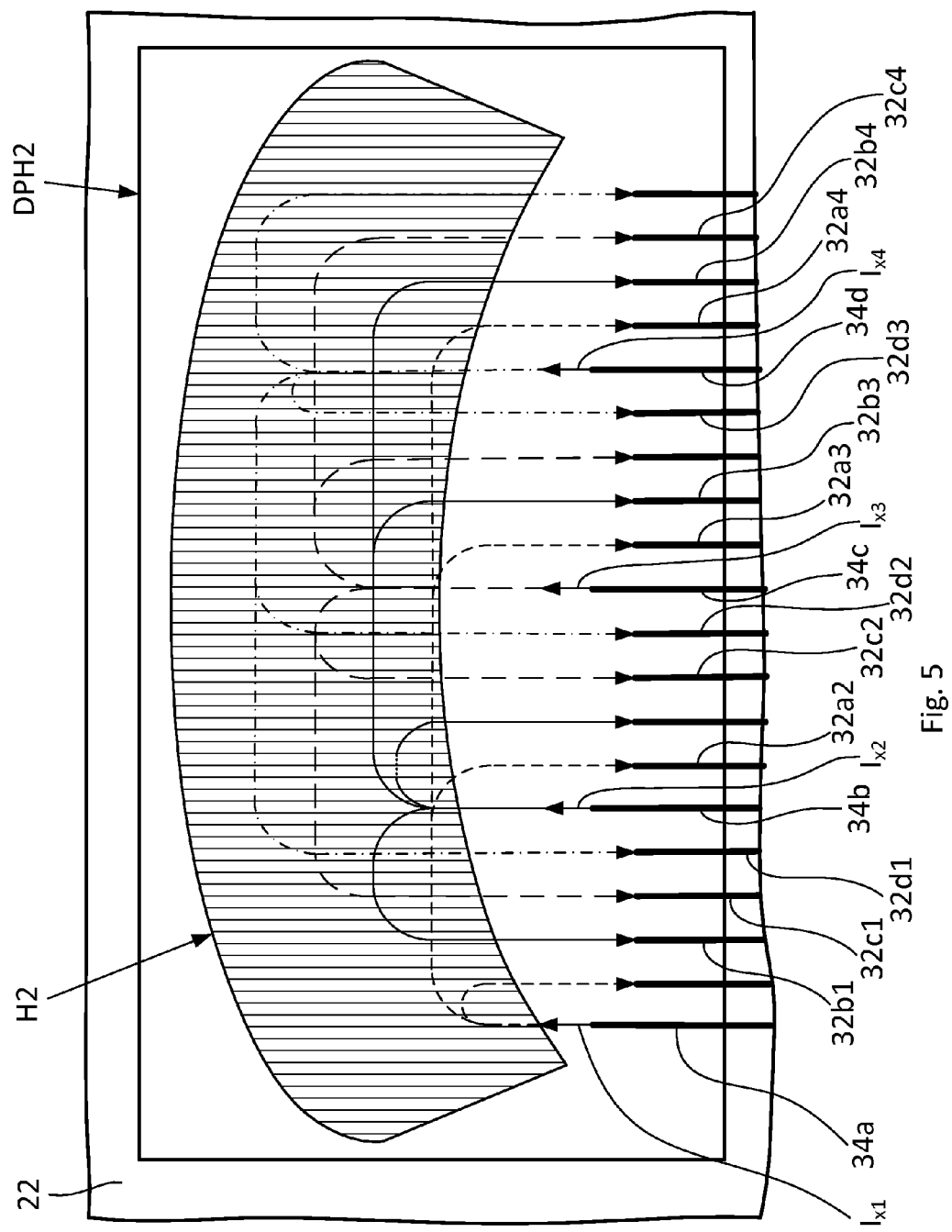

METHOD OF OPTICAL INTERCONNECTION OF DATA-PROCESSING CORES ON A CHIP

FIELD OF THE INVENTION

The present invention relates to the semiconductor industry and, in particular, to optical interconnects of electronic devices, e.g., of data-processing cores in multicore chips of a computer, or the like. More specifically, the method relates to optical interconnects of data-processing cores of multicore chips by means of digital planar holographic microchips.

BACKGROUND OF THE INVENTION

A multicore processor is a device that contains two or more independent computing components which are known as "cores or data-processing cores" that read and execute program instructions. Manufacturers typically integrate the data-processing cores onto a host-chip multiprocessor or CMP, or in a single chip package.

At the present time, dual-core processors are known as processors that have two cores; a quad-core processor contains four cores, a hexa-core processor contains six cores, and so on, up to 64 cores. It can be assumed that the number of cores on a host chip may further increase in the future.

Presently, a common network topology for interconnection involves metal interconnects of the type used inside the host chip and includes the use of buses, rings, two-dimensional meshes, and crossbars. The architecture of the network topology of multicore interconnects may be rather complicated and its development continues.

With the increase of computing power realized on a chip, the use of traditional electrical interconnects becomes a limiting factor, i.e., preventing further scaling of modern multicore processors. A solution envisioned for future generation high-performance processors involves employment of optical interconnects. Replacing conventional electrical wires with optical waveguides helps to increase the overall bandwidth of data transmission, maintains channel crosstalk at a low value, and reduces the chip footprint allocated for interconnections.

Methods and devices for optical interconnects between various electronic components mounted on the same or different PC boards of a computer, or between two or more independent chips, etc., are known in the art. The idea of optical interconnects, per se, is so obvious that it emerged much earlier than the appearance of multicore processors. In the past, the problem of optical interconnects has been solved in different ways.

For example, U.S. Pat. No. 5,832,147 issued Nov. 3, 1998 to Yeh, et al, discloses a holographic optical interconnect system and method for board-to-board and chip-to-chip communication interconnections. Each circuit board has at least an optically transparent substrate mate parallel to the circuit board and extending outside a circuit board holder. Each optically transparent substrate mate has parallel sides and carries at least two holographic optical elements. The first holographic optical elements on the first optically transparent substrate mate reflects at least a predetermined portion of a first light beam transmitted by a transmitter on a corresponding circuit board to another holographic optical element, which transmits a received light beam via free space outside the circuit board holder. On the other optically transparent substrate mate, two holographic optical elements are used to receive and direct at least part of the light beam received to a detector on a corresponding circuit board via free space within the circuit board holder or reflection within the optically transparent substrate mate.

U.S. Pat. No. H738 issued Feb. 6, 1990 to McManus, et al, discloses a switched hologram for reconfigurable optical interconnect. The device uses an array of optical switches that directs a set of optical beams toward any one of a selection of holograms, and each hologram when selected deflects the input beams toward a detector. The switches are arranged in rows, each optical switch includes a liquid crystal cell and a polarizing beam splitter, and each switch of said rows has an output face through which optical parallel beams can be projected to holographic spots of a hologram plate located adjacent to said output face and further from the holographic spots to detector means.

U.S. Pat. No. 5,515,462 issued May 7, 1996 to Huang, et al, discloses an optical interconnect in optical packages using holograms for interconnection of two optical elements. Light radiation from the first optical component, e.g., an optical light fiber, is directed onto the plane surface of the second optical component, e.g., a passive waveguide. The light is directed onto the second optical component at a convenient angle such that it impinges on the plane surface of the second optical component at an incident angle. An angularly selective coupling means, e.g., a volume hologram, is located between the first and second optical components for coupling the maximum amount of the light at the incident angle.

U.S. Pat. No. 5,706,114 issued Jan. 6, 1998 to Erteza discloses an optical communication system that uses holographic optical elements to provide guided wave and non-guided communication, resulting in high bandwidth and high-connectivity optical communications. Holograms within holographic optical elements route optical signals between elements and between nodes connected to elements. Angular and wavelength multiplexing allow the elements to provide high connectivity. The combination of guided and nonguided communication allows polyhedral system geometries.

U.S. Pat. No. 4,838,630 issued Jun. 13, 1989 to Jannson, et al, discloses an optical interconnect that employs planar volume Bragg hologram technology in two dimensions and comprises a dichromated gelatin planar volume Bragg hologram disposed in a glass planar optical path. Multiplexed Bragg plane sets selectively diffract information-bearing light signals such as voice, image, or computer data signals in a very large-scale integration (VLSI) system from a laser diode or a light-emitting diode (LED) source coupled to the planar optical path toward high-speed photodiodes. The holographic planar optical interconnect can interconnect up to 1000 different signals between VLSI microelectronic components and systems.

However, all approaches described above accomplish merely interconnection functions without any modulation or other data control processes and also do not match with the latest developments in the field of multicore processor technique in view of limitations with regard to the chip footprint allocated for interconnections. Furthermore, in spite of the fact that all known methods and devices described above with respect to optical interconnects possess essential advantages over traditional electrical interconnects, they did not find wide practical application in the industry because they do not match current semiconductor production technology.

SUMMARY OF THE INVENTION

The method of the invention provides specific optical interconnects between data-processing cores on a multicore chip. The interconnection elements are formed on the same host-chip substrate as the data-processing cores and comprise a service integral optical microchip (microchips) that is (are)

located on the same host chip and is (are) based on the use of the digital planar holography (DPH) technique. More specifically, the basic element of such a topology is a multiconnector hologram, which interconnects all processing cores on the chip. The holographic service integral optical microchip (hereinafter referred to as a "holographic microchip") performs commutation between the cores of the host chip with the use of planar digital ridge waveguides that are also formed on the same substrate as the cores and the holographic microchip. According to the method of the invention, the holographic microchip further incorporates a function of a wavelength demultiplexer for delivery light signals that are designated to specific cores.

The holographic microchip may obtain optical signals from one or several laser light sources and may be used for interconnection of a plurality of cores, e.g., 4 to 8 cores using ⅘ laser frequencies and avoid switches. A light source may be external, and the cores may be provided with respective optical modulators/transceivers that have a function of coding the obtained optical signals by modulating these signals with the core-generated data and with receivers that have a function of decoding the obtained data.

The method of the invention makes it possible to realize various interconnects with structures having distances between cores as short as several millimeters to approximately 1 cm or greater.

The DPH may have dimensions in the range of 0.05×0.05 cm to 0.5×0.5 cm, typically 0.1×0.1 cm. Interconnections between the light source, holographic microchip, and the cores are carried out by means of optical planar ridge waveguides.

According to one aspect of the method of the invention, each core operates on a predetermined light wavelength and comprises a direct current (DC) laser light input and a DC laser light modulator/transceiver for modulation of the obtained DC laser light and for transfer of the modulated light signal to each of the remaining, in this case three, cores of the host chip. Therefore, in addition to the DC input, each core should have three inputs for modulated light signals.

According to one aspect of the invention, the method for optically interconnecting a plurality of data-processing cores on a host chip comprises the following steps of: providing "N" laser light sources that generate lights of "N" different wavelength; providing at least one holographic microchip on the host chip that obtains the lights from the light sources and has a function of spatially splitting the obtained lights at least into (N−1)n optical signals; providing "N" data-processing cores with optical signal receivers and modulators or transceivers having a function of modulating the light obtained from the laser light sources with the data produced by the cores, said cores generating data; delivering the "N" laser lights to the "N" data-processing cores on the host chip; coding the obtained optical signals by modulating these signals with the core-generated data; delivering the modulated and coded optical signals to said at least one holographic microchip; splitting the modulated and coded optical signals by means of said at least one holographic microchip at least into (N−1)N modulated optical copy signals; delivering the modulated optical copy signals to all data-processing cores except one that generates said modulated optical copy signals; and decoding the data obtained from the output signals delivered to the processing cores by the receivers.

The "N" laser lights are delivered to the data-processing cores on the host chip through optical planar ridge waveguides; and the modulated optical copy signals are delivered to all data-processing cores except the one that generates said modulated optical copy signals also via optical planar ridge waveguides.

According to another aspect of the invention, the host chip may be provided with a second holographic microchip having a function of dividing the light obtained from laser light sources into "N" component laser lights of different wavelengths; and delivery of the "N" laser lights to the data-processing cores on the host chip is carried out with use of the second holographic microchip.

From the second microchip, delivery of the "N" laser lights of different wavelengths to the data-processing cores on the host chip is carried out also via optical planar ridge waveguides.

The host chip of the modification described above operates in the following way.

The input waveguide receives a DC laser light from a laser source, e.g., from an external laser system that provides four different wavelengths (e.g., in a 1310 nm window). These wavelengths are split by first holographic microchip, and each of the supplied wavelengths goes to the respective DC light inputs of the corresponding processing core that operates on the obtained light of the predetermined wavelength. The optical modulator/transceiver of each core converts its data into optical form. The output of each core sends the modulated light signal to the second holographic microchip that takes these signals, splits each of them into three, and delivers these three copies to all cores except the core that provided this signal. Thus, each of the cores is able to broadcast its data to all others. Central management is only required for selecting the signal to which the core should listen at each moment.

BRIEF DESCRIPTION OF THE DRAWINGS

FIG. 5 is a more detailed top view of the main holographic microchip that conventionally illustrates the process of copying the modulated signals delivered to the hologram of this holographic microchip from the data-processing cores.

DETAILED DESCRIPTION OF THE INVENTION

The present invention relates to a method for optically interconnecting data-processing cores, e.g., by means of digital planar holographic microchips. More specifically, the method of the invention provides a planar optical interconnection between data-processing cores on a multicore chip. The interconnect elements comprise optical microchips that are formed on the same host chip substrate as the data-processing cores and are based on the use of digital planar holography (DPH) technique. The interconnection elements also include ridge waveguides that are formed on the substrate and are used for linking the service integral optical microchips to respective cores.

In fact, the method comprises providing "N" laser light sources that generate lights of "N" different wavelength; providing "N" data-processing cores with optical signal receivers and modulators/transceivers having a function of modulating the light obtained from the laser light sources with the data produced by the cores, said cores generating data; providing at least one holographic microchip with a digital planar hologram; and controlling and processing optical signals that are delivered to the data-processing cores by means of the modulators/transceivers, the digital planar hologram, and the optical signal receivers.

In the context of the present invention, the term "planar" in connection with the optical interconnect is conventional because, strictly speaking, the interconnection elements such as the ridge waveguides and digital planar holograms are not two-dimensional but rather three-dimensional, as they comprise a very thin layered structure consisting at least of a substrate, two cladding layers, and a core layer between them, etc. Furthermore, the holographic elements are formed in the core layer as grooves and projections. However, compared to conventional multilayered integrated chips with metallic interconnects, the interconnection elements of the present invention are considered planar.

For better understanding the method of the invention, it is necessary first to get acquainted with the architecture and structure of the host chip with the aforementioned optical interconnection elements.

Figure 1:
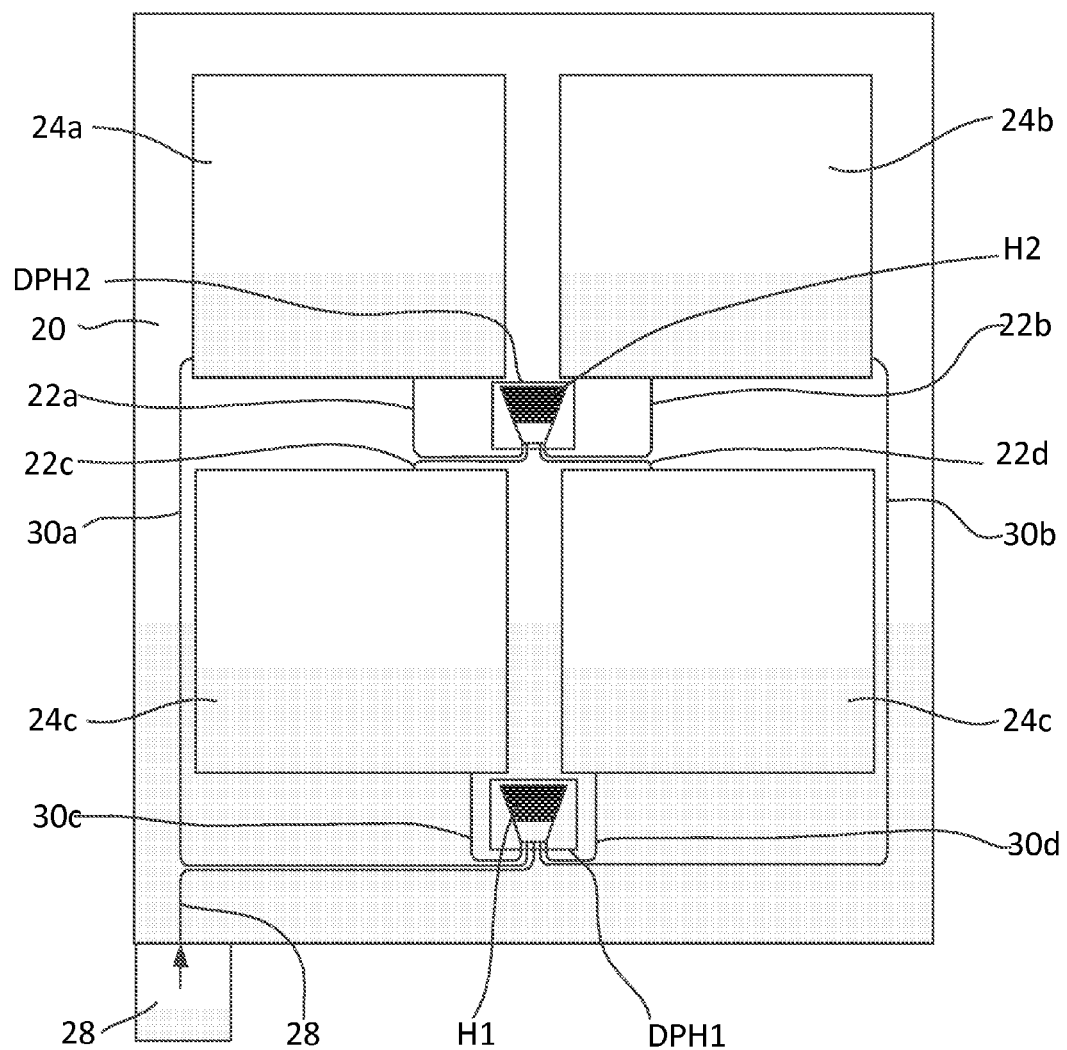
FIG. 1 is a schematic top view of the host chip having data-processing cores and optical elements interconnected by the method of the invention.
Figure 2:
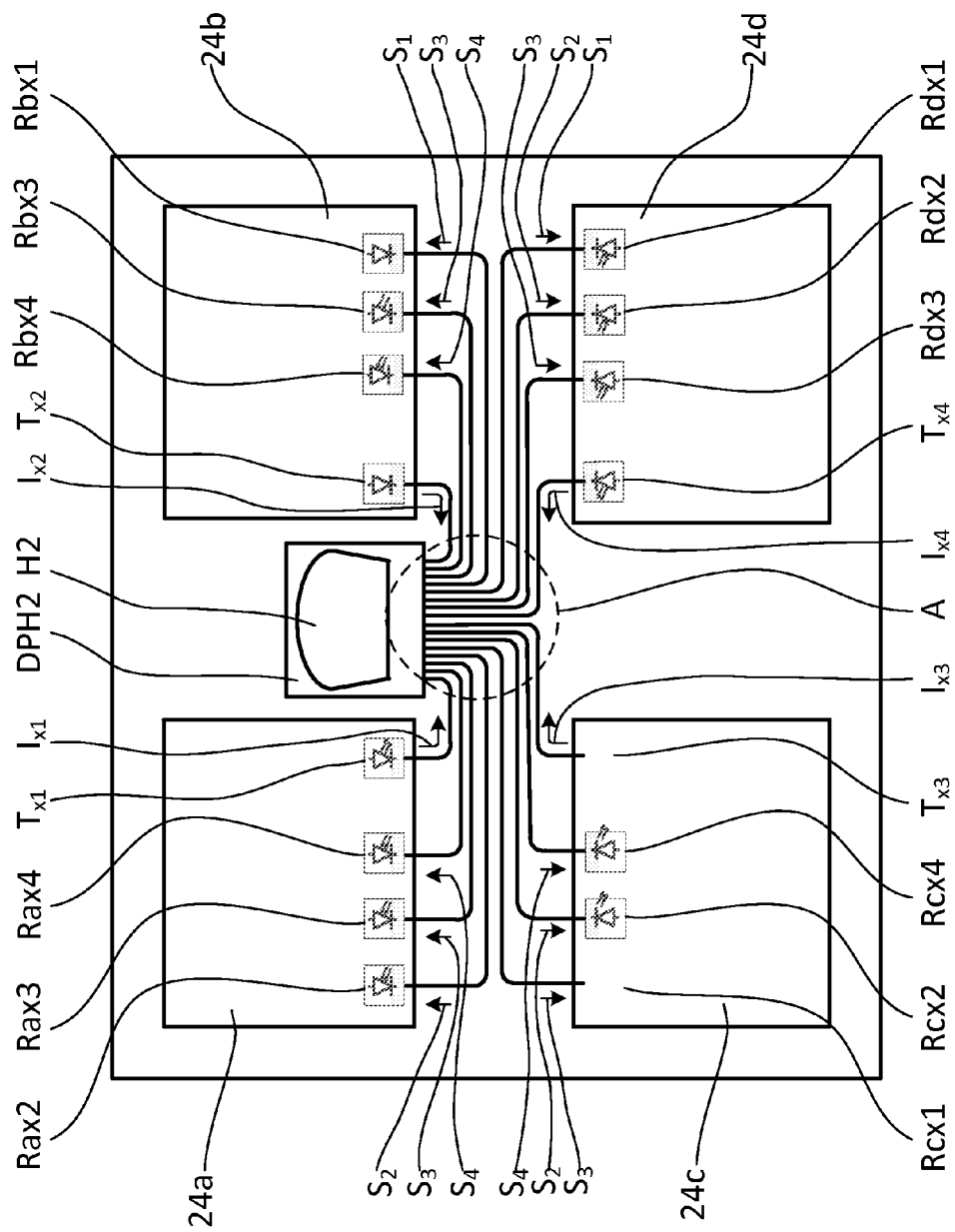
FIG. 2 is a more detailed top view of the host chip of FIG. 1 that illustrates inputs and outputs of the data-processing cores and of the main holographic microchip.

FIG. 1 is a schematic top view of a host chip 20 having a substrate 22 on which a plurality, in this modification four, data-processing cores 24a, 24b, 24c, and 24d, are formed. In the modification of FIG. 1, the data-processing cores 24a, 24b, 24c, and 24d are shown as four symmetrically arranged square blocks, and DPH1 and DPH2 are shown as auxiliary and main holographic microchips, respectively. FIG. 2 is a more detailed top view of the host chip 20 that does not show the auxiliary holographic microchip DPH1 but illustrates inputs and outputs of the data-processing cores and of the main holographic microchip DPH2.

Interconnection elements of the host chip 20 shown in FIG. 1 are multiconnectors DPH1 and DPH2, which interconnect all processing cores on the chip 20 and, in fact, comprise holographic service integral optical microchips (hereinafter referred to as "holographic microchips").

Reference numeral 26 (FIG. 1) designates a laser light source that comprises a plurality of monochromatic lasers, e.g., four lasers that emit laser lights, e.g., of $\lambda_1$, $\lambda_2$, $\lambda_3$, and $\lambda_4$ wavelengths, respectively. These monochromatic laser lights are delivered from the laser light source 26 to the inputs (not shown in FIG. 1) of the auxiliary holographic microchip DPH1 via a planar ridge waveguide 28 and are demultiplexed by means of a digital planar hologram H1 (hereinafter referred to merely as "hologram H1") of the DPH1, which is shown in more detail in FIG. 3 and is described in more detail later. It is understood that the DPH1 has an auxiliary function of demultiplexing the monochromatic laser lights LL and that these lights can be sent directly from the respective laser diodes to the inputs of the respective data-processing cores. Such a version is shown in FIG. 2.

As mentioned above, the hologram H1 of the auxiliary holographic microchip DPH1 is constructed and operates on the principle close to the one described U.S. Pat. No. 7,889,336 issued Feb. 15, 2011 to Yankov. In other words, the holographic microchip DPH1 spatially separates the lights of different wavelengths $\lambda_1$, $\lambda_2$, $\lambda_3$, and $\lambda_4$ and couples them to the planar ridge waveguides 30a, 30b, 30c, and 30d (FIG. 1) through which these monochromatic lights are delivered to data-processing cores 24a, 24b, 24c, and 24d that use the lights of the corresponding wavelengths for communication with the other data-processing cores 24a, 24b, 24c, and 24d formed on the substrate 22 of the multicore chip 20. In FIG. 1, reference numerals 23a, 23b, 23c, and 23d designate bunches of planar ridge waveguides. Each such bunch contains four planar ridge waveguides for different wavelengths.

Figure 3:
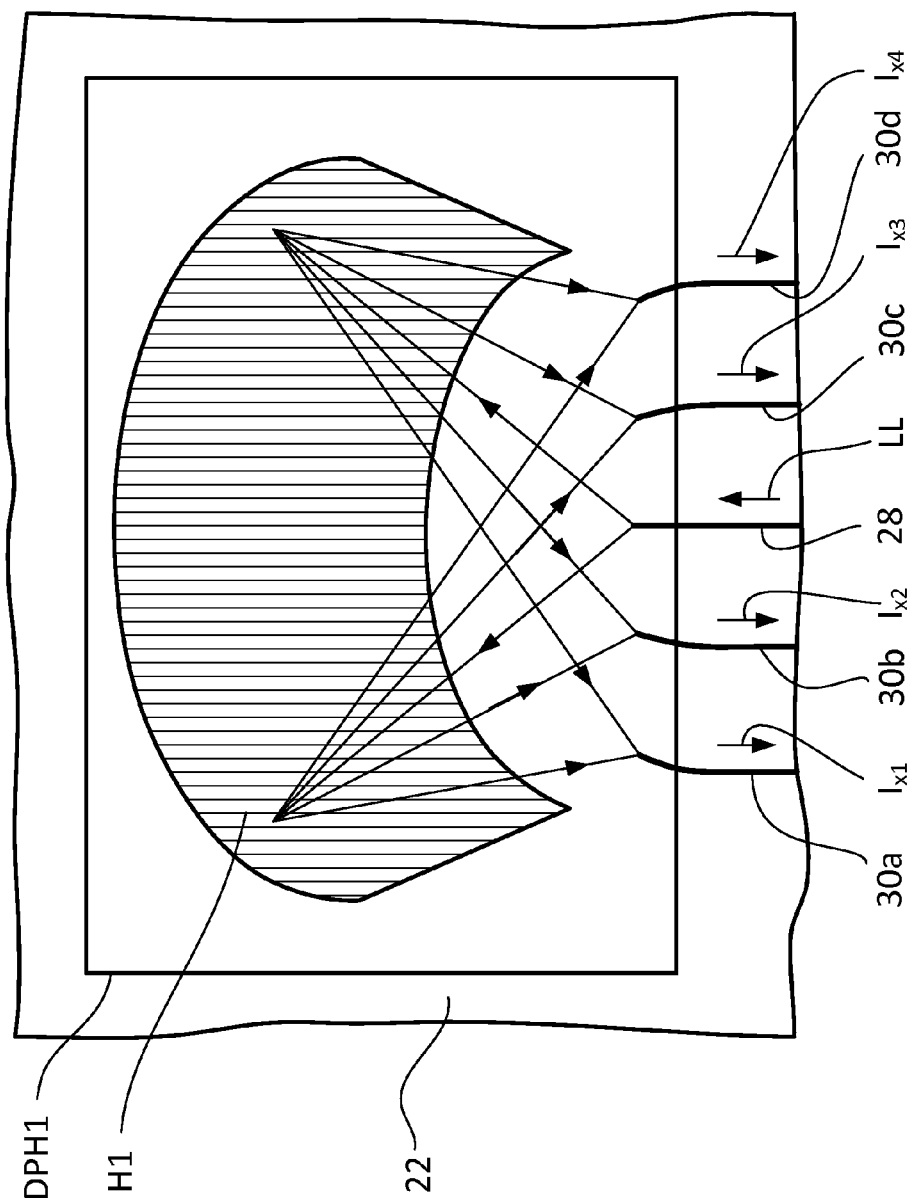
FIG. 3 is a more detailed top view of an auxiliary holographic microchip that functions as a wavelength demultiplexer that spatially separates the lights of different wavelengths.

FIG. 3 is a more detailed top view of the auxiliary microchip DHP1. In this drawing, the striped area is the hologram H1 of the auxiliary holographic microchip DPH1, which is described in more detail later. Reference numeral 28 designates the aforementioned planar ridge waveguide that delivers the monochromatic laser lights LL to the auxiliary holographic microchip DPH1. Reference numerals 30a, 30b, 30c, and 30d designate planar ridge waveguides through which the aforementioned monochromatic lights of different wavelengths are delivered to data-processing cores 24a, 24b, 24c, and 24d that use the lights of the corresponding wavelengths for communication with the other data-processing cores 24a, 24b, 24c, and 24d formed on the substrate 22 of the multicore chip 20. In FIGS. 2 and 3, the arrows $I_{x1}$, $I_{x2}$, $I_{x3}$, and $I_{x4}$ show directions of the lights propagating through the respective waveguides.

The topology of the hologram H1 is organized so that the light components with the wavelengths $\lambda_1$, $\lambda_2$, $\lambda_3$, and $\lambda_4$ are collected on the inputs of the planar ridge waveguides 30a, 30b, 30c, and 30d and, after being processed by the hologram H1, propagate through these waveguides 30a, 30b, 30c, and 30d to the data-processing cores 24a, 24b, 24c, and 24d.

In other words, the hologram H1 comprises a plurality of nano-features that modulate the refractive indices of planar waveguides where propagating lights are confined. The nano-features are positioned in a manner to provide resonant reflection of lights of predefined wavelengths so that multiple wavelengths are reflected to the assigned output ports and then propagate toward the inputs of the cores. The topology of the hologram H1 is defined by solving the set of appropriate equations of the type presented in the above-mentioned U.S. Pat. No. 7,889,336 with the boundary conditions that correspond to inputs and outputs of the optical planar ridge waveguides 28, 30a, 30b, 30c, and 30d (FIG. 3).

Each data-processing core 24a, 24b, 24c, and 24d is provided with an optical modulator/transceiver, such as $T_{x1}$, $T_{x2}$, $T_{x3}$, and $T_{x4}$, respectively, that is intended for converting the core data into an optical form of modulated optical signals $I_{x1}$, $I_{x2}$, $I_{x3}$, and $I_{x4}$ (FIG. 2). In other words, the optical modulator/transceivers $T_{x1}$, $T_{x2}$, $T_{x3}$, and $T_{x4}$ have a function of coding the obtained optical signals by modulating them with the core-generated data.

The holographic microchip DPH2, which is the main or indispensible holographic microchip, has a plurality of inputs that are intended for receiving the modulated signals $I_{x1}$, $I_{x2}$, $I_{x3}$, and $I_{x4}$ from the cores 24a, 24b, 24c, and 24d transmitted by their respective modulator/transceivers $T_{x1}$, $T_{x2}$, $T_{x3}$, and $T_{x4}$ on respective wavelengths $\lambda_1$, $\lambda_2$, $\lambda_3$, and $\lambda_4$ (FIG. 2). A digital planar hologram H2 (hereinafter referred to merely as "hologram H2") of the main holographic microchip DPH2 is formed on the same principles as the hologram H1 of the DPH1 but is essentially different in its topology and principle of operation. More specifically, the hologram H2 of the holographic microchip DPH2 takes the modulated signals obtained from each core, splits each of them into three copies, and delivers a copy of each modulated signal to all cores except the core from which the copies are sent. More specifically, as shown in FIG. 2, the core 24a receives three modulated signals S2, S3, and S4 on the wavelengths $\lambda_2$, $\lambda_3$, and $\lambda_4$; the core 24b receives three modulated signals on the wavelengths $\lambda_1$, $\lambda_3$, and $\lambda_4$; the core 24c receives three modulated signals on the wavelengths $\lambda_1$, $\lambda_2$, and $\lambda_4$; and the core 24*d* receives three modulated signals on the wavelengths $\lambda_1$, $\lambda_2$, and $\lambda_3$ (FIG. 2).

Figure 4:
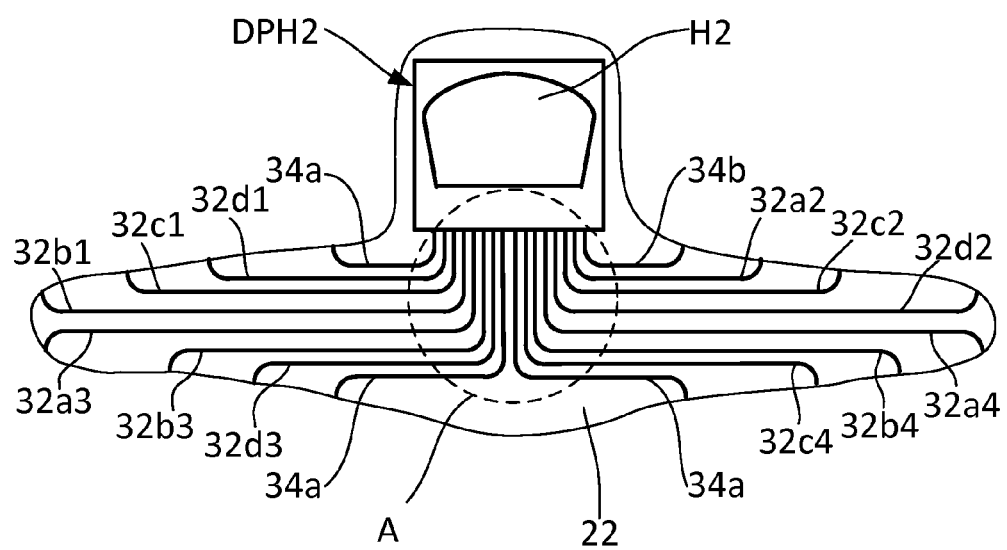
FIG. 4 is a plan view of the area A of the main holographic microchip shown in a larger scale than in FIG. 2.

The aforementioned modulated signals $I_{x1}$, $I_{x2}$, $I_{x3}$, and $I_{x4}$ are delivered from the cores 24*a*, 24*b*, 24*c*, and 24*d* to the main holographic chip DPH2 via the respective input plane ridge waveguides 34*a*, 34*b*, 34*c*, and 34*d*. This is shown in FIG. 4, which is a plan view of the area A of the main holographic microchip DPH2, which is shown on a larger scale than in FIG. 2. More specifically, this drawing shows the main holographic microchip DPH2 and four triplets of signal copies for the light of each wavelength. Thus, waveguides 32*b*1, 32*c*1, and 32*d*1 deliver three signals $I_{x2}$, $I_{x3}$, and $I_{x4}$ of wavelength $\lambda_2$, $\lambda_3$, and $\lambda_4$; waveguides 32*a*2, 32*c*2, and 32*d*2 deliver three signals $I_{x1}$, $I_{x3}$, and $I_{x4}$ of wavelength $\lambda_1$, $\lambda_3$, and $\lambda_4$; waveguides 32*a*3, 32*b*3, and 32*d*3 deliver three signals $I_{x1}$, $I_{x2}$, and $I_{x4}$ of wavelength $\lambda_1$, $\lambda_2$, and $\lambda_4$; and waveguides 32*a*4, 32*b*4, and 32*c*4 deliver three signals $I_{x1}$, $I_{x2}$, and $I_{x3}$ of wavelength $\lambda_1$, $\lambda_2$, and $\lambda_3$.

Referring again to the waveguide bunches 23*a*, 23*b*, 23*d* and 23*c*, it should be noted that the bunch 23*a* comprises the waveguides 34*a*, 32*b*1, 32*c*1, and 32*d*1. The bunch 23*b* comprises the waveguides 34*b*, 32*a*2, 32*c*2, and 32*d*2. The bunch 23*c* comprises the waveguides 34*c*, 32*a*3, 32*b*3, and 32*d*3. The bunch 23*d* comprises the waveguides 34*d*, 32*a*4, 32*b*4, and 32*c*4 (FIG. 1 and FIG. 4).

FIG. 5 is a top view of the main holographic microchip DPH2 that conventionally illustrates the process of copying the modulated signals $I_{x1}$, $I_{x2}$, $I_{x3}$, and $I_{x4}$ that are delivered to the hologram H2 of the main holographic microchip DPH2 from the data-processing cores 24*a*, 24*b*, 24*c*, and 24*d* (FIG. 1). Although similar to the hologram H1 of the auxiliary holographic microchip DPH2, the hologram H2 of the main holographic microchip DPH2 comprises a plurality of nano-features in the form of, e.g., dashes, their topology is defined by a different function and therefore is essentially different. More specifically, according to the method of the invention, the pattern of the nano-features of the hologram H2 is defined by the variation $\Delta n(x, y)$ of the effective refractive index of the two-dimensional planar waveguide in accordance with formula:

$$\Delta n(x,y) = \iint f_{in}(x,y,\omega) f_{out}(x,y,\omega) d\omega,$$

where $f_{in}(x, y, \omega)$ and $f_{out}(x, y, \omega)$ are Fourier components of desirable incoming and outgoing waves, $$f_{in}(x, y, \omega) \cong \sum_n C_n \exp(ik_n r_n) f(\omega)$$

$$f_{out}(x, y, \omega) \cong \sum_m C_m \exp(-ik_m r_m) f(\omega),$$

where $k_n$ and $k_m$ are wave vectors designated to the interconnections numbers n and m, and $r_n$ and $r_m$ are the distances from the incoming and outgoing ports of the detectors and modulators, respectively.

The modulators/transceivers of the data-processing cores (FIG. 2) are prescribed an individual lambda and frequency so that the core m is prescribed frequency $\omega_m$, hence $f\omega$ in $$f_{out}(x, y, \omega) \cong \sum_m C_m \exp(-ik_m r_m) f(\omega)$$

can be approximated by the delta function $f(\omega) = \delta(\omega - \omega_m)$.

The variation of the effective refractive index $\Delta n(x, y)$ may be approximated by a composition of simplified binary structures, for example, rectangular dashes.

Furthermore, the variation of the effective refractive index $\Delta n(x, y)$ may also be approximated by a composition of simplified binary structures, which are placed near maxima or minima of the original variation of the effective refractive index $\Delta n(x, y)$ given by the above formula.

The system operates in the following way.

The input waveguide 28 receives four monochromatic laser lights having wavelengths $\lambda_1$, $\lambda_2$, $\lambda_3$, and $\lambda_4$ (FIG. 2) from the laser light sources 26, e.g., laser diodes, and delivers them to the auxiliary holographic microchip DPH1, where these component lights are spatially split and sent to the cores 24*a*, 24*b*, 24*c*, and 24*d* via the ridge waveguides 30*a*, 30*b*, 30*d*, and 30*c*, respectively (FIGS. 1 and 3). As mentioned above, the cores 24*a*, 24*b*, 24*c*, and 24*d* contain optical modulators/transceivers $T_{x1}$, $T_{x2}$, $T_{x3}$, and $T_{x4}$ that convert the data signals generated by the respective cores by modulating the assigned lights of the corresponding wavelengths into optical signals $I_{x1}$, $I_{x2}$, $I_{x3}$, and $I_{x3}$. These signals are sent to the main holographic microchip DPH2 (FIGS. 4 and 5) via the planar ridge waveguide 34*a*, 34*b*, 34*c*, and 34*d*. The hologram H2 of the DPH2 splits the optical signal obtained from each data-processing core into a plurality of signal copies, three in the illustrated case, and each signal copy is sent to all other data-processing cores, i.e., to the cores other than the one that generates the original signal.

More specifically, the modulated signal $I_{x1}$ obtained from the core 24*a* is split into three signals S1', S1", and S1''' that are delivered to the data-processing cores 24*b*, 24*c*, and 24*d* via ridge waveguides 32*b*1, 32*c*1, and 32*d*1, respectively. The modulated signal $I_{x2}$ obtained from the core 24*b* is split into three signals S2', S2", and S2''' that are delivered to the data-processing cores 24*a*, 24*c*, and 24*d* via ridge waveguides 32*a*2, 32*c*2, and 32*d*2, respectively. The modulated signal $I_{x3}$ obtained from the core 24*c* is split into three signals S3', S3", and S3''' that are delivered to the data-processing cores 24*a*, 24*b*, and 24*d* via ridge waveguides 32*a*3, 32*b*3, and 32*d*3, respectively. The modulated signal $I_{x4}$ obtained from the core 24*d* is split into three signals S4', S4", and S4''' that are delivered to the data-processing cores 24*a*, 24*b*, and 24*c* via ridge waveguides 32*a*4, 32*b*4, and 32*c*4, respectively (FIGS. 2 and 4). Each core has three independent optical signal receivers, each of which receives signals from one of three remaining cores. In other words, the data-processing core 24*a* receives the respective copy signals to receivers $R_{ax2}$, $R_{ax3}$, and $R_{ax4}$; the data-processing core 24*b* receives the respective copy signals to receivers $R_{bx1}$, $R_{bx3}$, and $R_{bx4}$; the data-processing core 24*c* receives the respective copy signals to receivers $R_{cx1}$, $R_{cx2}$, and $R_{cx4}$; and the data-processing core 24*d* receives the respective copy signals to receivers $R_{dx1}$, $R_{dx2}$, and $R_{dx4}$.

The method of the invention is efficient in that it allows replacing the electrical interconnections for core communication with optical interconnections by employing holographic microchips that perform the aforementioned interconnection in a single functional layer structure. This makes it possible to exclude communication-line cross and thus to significantly reduce crosstalk. It is understood that this architecture is scalable up to a dozen of processing cores or even more. Furthermore, in this case it becomes more efficient to have a hierarchy of interconnections instead of the flat each-to-each configuration. All of the discussed patterns can be also realized with a single holographic microchip.

Although the method of the invention has been described with reference to specific examples, it is understood that the invention is not limited by the given examples, and any changes and modifications are possible without departure from the scope of the claims given below. For example, the number and mutual position of the data-processing cores on the chip may be different from those shown in the drawings, and the cores can be used in amounts less than four or greater than four. The modulators/transceivers may be formed directly in the pattern of the data-processing core or beyond the limits of the data-processing core and are linked thereto by electrical interconnects.

We claim:

1. A method of optically interconnecting data-processing cores on a host chip comprising the steps of:
providing "N" laser light sources that generate lights of "N" different wavelengths;
providing at least one holographic microchip on the host chip that obtains the lights from the light sources and has a function of spatially splitting the obtained lights at least into (N−1)N optical signals;
providing "N" data-processing cores with optical signal receivers and modulators/transceivers having a function of modulating the light obtained from the laser light sources with the data produced by the cores, said cores generating data;
delivering the "N" laser lights to the "N" data-processing cores on the host chip;
coding the obtained optical signals by modulating these signals with the core-generated data;
delivering the modulated and coded optical signals to said at least one holographic microchip;
splitting the modulated and coded optical signals by means of said at least one holographic microchip at least into (N−1)N modulated optical copy signals;
delivering the modulated optical copy signals to all data-processing cores except the one that generates said modulated optical copy signals;
decoding the data obtained from the output signals delivered to the processing cores by the receivers;
delivering the "N" lasers light to the data-processing cores on the host chip through optical planar ridge waveguides;
delivering the modulated optical copy signals to all data-processing cores except the one that generates said modulated optical copy signals via optical planar ridge waveguides;
providing the host chip with a second holographic microchip having a function of dividing the light obtained from laser light sources into "N" component laser lights of different wavelengths; and
carrying out said step of delivering the "N" lasers light to the data-processing cores on the host chip with the use of said second holographic microchip.

2. The method of claim 1, comprising the step of delivering the "N" laser lights to the data-processing cores on the host chip from the second holographic microchip via optical planar ridge waveguides.

3. A method of optically interconnecting data-processing cores on a host chip comprising the steps of:
providing "N" laser light sources that generate lights of "N" different wavelengths;
providing "N" data-processing cores with optical signal receivers and modulators/transceivers having a function of modulating the light obtained from the laser light sources with the data produced by the cores, said cores generating data;
providing at least one holographic microchip with a digital planar hologram;
controlling and processing optical signals that are delivered to the data-processing cores by means of the modulators/transceivers, the digital planar hologram, and optical signal receivers;
providing optical planar ridge waveguides;
delivering the "N" lasers light to the data-processing cores on the host chip through the optical planar ridge waveguides;
delivering the modulated optical copy signals to all data-processing cores except the one that generates said modulated optical copy signals via the optical planar ridge waveguides;
providing the host chip with a second holographic microchip having a function of dividing the light obtained from laser light sources into "N" component laser lights of different wavelengths; and
carrying out said step of delivering the "N" lasers light to the data-processing cores on the host chip with the use of said second holographic microchip, wherein the step of controlling and processing optical signals comprises:
delivering the "N" laser lights to the "N" data-processing cores on the host chip;
coding the obtained optical signals by modulating these signals with the core-generated data;
delivering the modulated and coded optical signals to said at least one holographic microchip;
splitting the modulated and coded optical signals by means of said at least one holographic microchip at least into (N−1)N modulated optical copy signals;
delivering the modulated optical copy signals to all data-processing cores except the one that generates said modulated optical copy signals; and
decoding the data obtained from the output signals delivered to the processing the receivers.

4. The method of claim 3, comprising the step of:
providing said at least one holographic microchip with a first digital planar hologram;
spatially splitting the obtained lights at least into (N−1)N optical signals by means of said first digital planar hologram;
delivering the "N" laser lights to the data-processing cores on the host chip through the optical planar ridge waveguides; and
delivering the modulated optical copy signals to all data-processing cores except the one that generates said modulated optical copy signals via the optical planar ridge waveguides.

5. A method of optically interconnecting data-processing cores on a host chip comprising the steps of:
providing "N" laser light sources that generate lights of "N" different wavelengths;
providing at least one holographic microchip on the host chip that obtains the lights from the light sources and has a function of spatially splitting the obtained lights at least into (N−1)N optical signals;
providing "N" data-processing cores with optical signal receivers and modulators/transceivers having a function of modulating the light obtained from the laser light sources with the data produced by the cores, said cores generating data;
delivering the "N" laser lights to the "N" data-processing cores on the host chip;
coding the obtained optical signals by modulating these signals with the core-generated data;

delivering the modulated and coded optical signals to said at least one holographic microchip;

splitting the modulated and coded optical signals by means of said at least one holographic microchip at least into (N−1)N modulated optical copy signals;

delivering the modulated optical copy signals to all data-processing cores except the one that generates said modulated optical copy signals;

decoding the data obtained from the output signals delivered to the processing cores by the receivers;

providing said at least one holographic microchip with a first digital planar hologram;

spatially splitting the obtained lights at least into (N−1)N optical signals by means of said first digital planar hologram;

delivering the "N" laser lights to the data-processing cores on the host chip through optical planar ridge waveguides;

delivering the modulated optical copy signals to all data-processing cores except the one that generates said modulated optical copy signals via optical planar ridge waveguides;

providing the host chip with a second holographic microchip having a second digital planar hologram with a function of spatially dividing the light obtained from laser light sources into "N" component laser lights of different wavelengths; and carrying out said step of delivering the "N" laser lights to the data-processing cores on the host chip with the use of the second digital planar hologram of said second holographic microchip.

6. The method of claim 5, comprising the step of delivering the "N" laser lights to the data-processing cores on the host chip from the second digital planar hologram via optical planar ridge waveguides.

7. The method of claim 6, comprising the steps of:

delivering the "N" laser lights to the data-processing cores on the host chip through optical waveguides; and delivering the modulated optical copy signals to all data-processing cores except the one that generates said modulated optical copy signals via optical plane ridge waveguides.

8. The method of claim 7 comprising the steps of:

providing the host chip with a second holographic microchip having a function of dividing the light obtained from laser light sources into "N" component laser lights of different wavelengths; and carrying out said step of delivering the "N" lasers light to the data-processing cores on the host chip with the use of said second holographic microchip.

9. The method of claim 5, wherein the first digital planar hologram comprises a pattern of nano-features defined by the variation $\Delta n(x, y)$ of the effective refractive index of the two-dimensional planar waveguide in accordance with the following formula:

$$\Delta n(x,y) = \int\!\!\int f_{in}(x,y,\omega) f_{out}(x,y,\omega) d\omega,$$

where $f_{in} f(x, y, \omega)$ and $f_{out}(x, y, \omega)$ are Fourier components of desirable incoming and outgoing waves, $$f_{in}(x, y, \omega) \cong \sum_n C_n \exp(ik_n r_n) f(\omega)$$

$$f_{out}(x, y, \omega) \cong \sum_m C_m \exp(-ik_m r_m) f(\omega)$$

where $k_n$ and $k_m$ are wave vectors designated to the interconnections numbers n and m, and $r_n$ and $r_m$ are the distances from the incoming and outgoing ports of the detectors and modulators, respectively.

10. The digital planar hologram method of claim 9, wherein the modulator/transceiver of each core is prescribed an individual light wavelength and corresponding frequency $\omega_m$, hence $f(\omega)$, wherein $$f_{out}(x, y, \omega) \cong \sum_m C_m \exp(-ik_m r_m) f(\omega)$$

can be approximated by the delta function $f(\omega) = \delta(\omega - \omega_m)$.

11. The digital planar hologram method of claim 9, wherein variation of the effective refractive index $\Delta n(x, y)$ is approximated into a two-dimensional distribution of simplified binary structures.

12. The method of claim 11, wherein the simplified binary structures are rectangular dashes.

13. The method of claim 12, wherein the approximation of the $\Delta n(x, y)$ into the two-dimensional distribution of simplified binary structures is assigned near maxima or minima of the original variation of the effective refractive index $\Delta n(x, y)$.

* * * * *